July 17, 1956  B. L. SCHERER  2,755,429
VOLTAGE REGULATOR
Filed March 15, 1954

BERNARD L. SCHERER
INVENTOR

BY Ralph E. Bitner
ATTORNEY

United States Patent Office 2,755,429
Patented July 17, 1956

2,755,429

VOLTAGE REGULATOR

Bernard L. Scherer, Stamford, Conn., assignor to Sorensen & Company, Inc., Stamford, Conn.

Application March 15, 1954, Serial No. 416,042

3 Claims. (Cl. 323—66)

This invention relates to voltage regulators for fixed loads and has particular reference to an alternating current supply regulator for arc lamps. The voltage regulator described below applies a constant A. C. voltage to the terminals of a fixed load even though the alternating current supply may vary within a range of voltage values above and below the rated value.

Arc lamps have been operated in a variety of circuits, some of which included a constant current supply which fed a large number of lamps in series. This connection produced an annoying flickering and light flux of variable magnitude because the constant current source had a long time constant and because a change in impedance in one lamp produced a momentary effect on all the other lamps. Other lamp circuits contained ballast impedances in series with the arc but these were inefficient from a power standpoint.

The modern arc lamp contains a series solenoid with a clutch arrangement for feeding one of the arc electrodes into a combustion chamber. This feeding device maintains the arc length constant and also maintains a constant impedance at the lamp terminals. For this reason, the regulator herein described regulates only when the applied voltage of the A. C. supply is varied.

One of the objects of this invention is to provide an improved regulator for fixed loads which avoids one or more of the disadvantages and limitations of prior art arrangements.

Another object of the invention is to transmit sufficient current for the operation of a high intensity arc lamp without the use of large heavy circuit components.

Another object of the invention is to isolate the arc lamp from the A. C. supply by means of a series ballast reactor so that other arc lamps connected to the same supply line will not be affected by the current voltage characteristics of the arc.

Another object of the invention is to improve the operation of arc lamps so that they may produce an even, non-flickering, source of light.

The invention comprises a tuned circuit having a capacitor and a saturable reactor in parallel. This circuit is connected across the supply line in series with a transformer primary, the secondary of which is connected to a rectifier and a direct current control coil of a series saturable core reactor. The series saturable core reactor and a ballast reactor are connected in series between the supply line and the load.

For a better understanding of the present invention, together with other and further objects thereof, reference is made to the following description taken in connection with the accompanying drawings.

Figure 1:
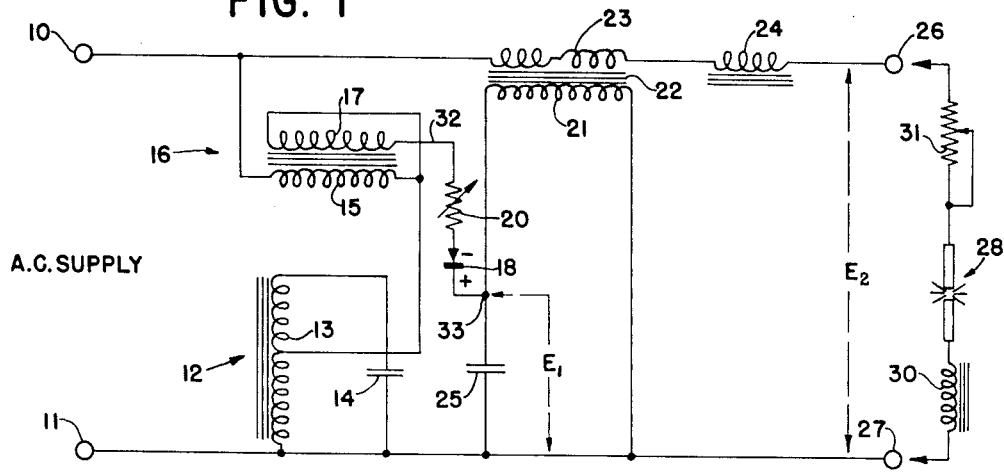
Fig. 1 is a schematic diagram of connections of the voltage regulator showing an arc lamp connected as a load.

Referring now to Fig. 1 a pair of terminals 10, 11 are for connection to an alternating current supply line having a voltage which may vary considerably above or below a desired rated value. A parallel resonant circuit 12 is connected to one terminal and comprises a reactor 13 and a capacitor 14. During normal operation the core of reactor 13 is partially saturated so that an increase or decrease of the supply voltage changes the inductance value of the reactor and changes the resonant frequency of the circuit 12. The other terminal 10 is connected through a primary winding 15 of a transformer 16 and then to a tap on reactor 13.

The secondary winding 17 of transformer 16 is connected between the same tap connection and a rectifier element 18 in series with a resistor 20. The other side of rectifier 18 is connected to a direct current control coil 21 which is wound on a saturable core 22. This core also supports a winding 23 which is in series between the supply terminal 10 and a ballast reactor 24. A large capacitor 25 is bridged across the terminals of coil 21 to eliminate the alternating current components.

The combination of circuits 12 and 16 constitutes a well known voltage regulator circuit which is shown and described in standard handbooks such as the Radio Engineer's Handbook by F. E. Terman, published by McGraw-Hill Book Company in New York, 1943, page 616. The circuit shown in Fig. 1 is an improvement on such regulators and provides a more precise control and a smaller range of output voltages.

Output terminals 26, 27 are provided for connection with a fixed load which may be an arc light 28 as indicated in the drawing. The arc light assembly includes a solenoid 30 for operating a clutch (not shown) to advance one of the lamp electrodes into the arc chamber when needed. A variable resistor 31 is employed to vary the light intensity.

The operation of this circuit may be described as follows: During normal operation at an average value of supply voltage the resonant circuit 12 is in resonance and the core of transformer 12 is partly saturated. The lower part of winding 13 receives part of the supply voltage and winding 17 on transformer 16 also contributes a voltage but the latter is an opposing voltage and the voltage on conductor 32 is the difference between these voltages. After rectification by element 18 and smoothing by capacitor 25 a direct current is supplied to winding 21 which limits the reactance of winding 23 to an average value.

Figure 2:
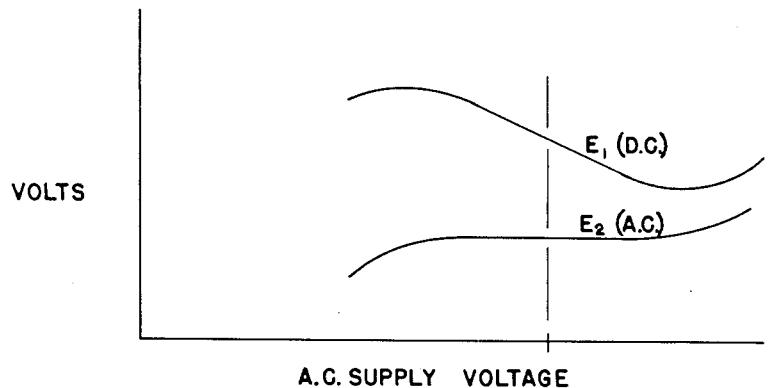
Fig. 2 is a graph showing the variation of certain voltages with respect to the supply voltage.

Now, if the voltage of the A. C. supply is raised an appreciable amount the current in winding 13 is increased and as a result the core becomes more saturated and the resonant circuit is detuned presenting a lower voltage across the parallel circuit. The increased current through winding 15 creates a greater voltage on winding 17 but since this voltage is in opposition to the voltage across winding 13 the total voltage on conductor 32 and the D. C. voltage of point 33 is lowered as shown in Fig. 2 by the curve $E_1$. This action reduces the direct current through winding 21 and causes an increase of reactance in winding 23, thereby reducing the voltage $E_2$ at the output terminals to the previous average value. If the supply voltage is lowered, instead of being raised, the reverse is true and the output voltage is increased to maintain it at the desired value.

Resistor 20 is employed to balance the regulating value of the circuit and to counteract any variations in circuit components due to manufacturing tolerances. Its value is set after the regulator is tested and need not be changed for subsequent use.

Fig. 2 indicates that the output voltage $E_2$ remains constant at the desired value even if the supply voltage is varied 20 percent above or below its normal value.

While there have been described and illustrated specific embodiments of the invention, it will be obvious that various changes and modifications may be made therein

I claim:

1. An alternating current voltage regulator comprising; a pair of input terminals, one of which is connected to one side of a parallel resonant circuit which includes a capacitor and a first saturable reactor and the other terminal connected to one end of a primary winding of a transformer, the other end of which is connected to the first saturable reactor; a pair of terminals for an output circuit which includes a second saturable reactor having a direct current control winding for varying its reactance; and a secondary winding on said transformer which is connected in series with the first saturable reactor, a rectifier, and the direct current control winding; said secondary winding connected so as to oppose the voltage drop across said first reactor and to supply a direct current for said control winding which decreases when the input voltage is increased.

2. An alternating current voltage regulator comprising; an input circuit for connection to an alternating current power supply which may vary in applied voltage; said input circuit including in series connection, a primary winding of a transformer and a portion of a first saturable reactor; said first saturable reactor connected in parallel with a capacitor to form a resonant circuit; an output circuit connected in series with the input circuit and a second saturable reactor having a direct current control winding for varying its reactance; and a secondary winding on said transformer connected in series with a rectifier, a portion of said first saturable reactor, and the direct current control winding for increasing the saturation value of the second saturable reactor when the voltage of the power supply is lowered.

3. An alternating current voltage regulator in accordance with claim 1 wherein said first and second saturable reactors are normally operated near the saturation value.

References Cited in the file of this patent

UNITED STATES PATENTS

| | | |
|---|---|---|
| 2,636,158 | Bedford | Apr. 21, 1953 |
| 2,667,616 | Lang | Jan. 26, 1954 |